(12) United States Patent
Maruoka

(10) Patent No.: US 6,649,100 B2
(45) Date of Patent: Nov. 18, 2003

(54) METHOD OF PRODUCING RUBBER THREAD FOR GOLF BALL AND RUBBER THREAD FOR GOLF BALL

(75) Inventor: Kiyoto Maruoka, Hyogo (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 114 days.

(21) Appl. No.: 09/725,086

(22) Filed: Nov. 29, 2000

(65) Prior Publication Data

US 2001/0002736 A1 Jun. 7, 2001

(30) Foreign Application Priority Data

Dec. 3, 1999 (JP) .............................. 11-344823

(51) Int. Cl.[7] ................................. D01D 5/42
(52) U.S. Cl. ........................................ 264/147
(58) Field of Search .......................... 264/147

(56) References Cited

U.S. PATENT DOCUMENTS 2,297,622 A * 9/1942 Herman ..................... 264/147

FOREIGN PATENT DOCUMENTS

| JP | 56-34736 A | 4/1981 |
| JP | 63-240888 A | 10/1988 |
| JP | 2674221 B2 | 7/1997 |
| JP | 11-004913 A | 1/1999 |
| JP | 11-170724 A | 6/1999 |

* cited by examiner

*Primary Examiner*—Leo B. Tentoni
(74) *Attorney, Agent, or Firm*—Birch, Stewart, Kolasch & Birch, LLP

(57) ABSTRACT

A method of producing a rubber thread for a golf ball includes (a) an extruding process of extruding a rubber composition in the shape of a sheet by using an extruder (2) to obtain a sheet material (6); (b) a rolling process of rolling the sheet material (6) to make it thin to obtain a thin sheet material (10); (c) a cross-linking process of cross-linking the thin sheet material (10) to obtain a cross-linked sheet material; and (d) a cutting process of cutting the cross-linked sheet material to obtain a rubber thread. The rolling process is performed successively to the extruding process. The thickness t1 of the sheet material (6) obtained in the extruding process is set to a range of 1 mm to 8 mm both inclusive. The thickness t2 of the thin sheet material (10) obtained in the rolling process is set to a range of 0.3 mm to 0.6 mm both inclusive.

8 Claims, 4 Drawing Sheets

METHOD OF PRODUCING RUBBER THREAD FOR GOLF BALL AND RUBBER THREAD FOR GOLF BALL

BACKGROUND OF THE INVENTION

1. Field of the Invention

The present invention relates to a method of producing the rubber thread for use in a golf ball and a rubber thread for a golf ball.

2. Description of the Related Art

The golf ball is classified into a wound golf ball whose core consists of a center piece and rubber thread wound around the center piece and a solid golf ball whose core consists of solid rubber. The wound golf ball gives a good feeling to a golfer when the golfer hits it and can be controlled in its flight distance, its flight direction and the like, whereas the solid golf ball can make a long flight and is durable. The wound golf ball has been used for a long time. In some days, the wound golf ball was used as the high-class golf ball. However, the solid golf ball developed later can be produced easily and at a low cost. Thus, in recent years, the solid golf ball is put on the market more than the wound golf ball. In such a situation, many professional golfers and high-class amateur golfers still like the wound golf ball because they can control the wound golf ball better than the solid golf ball in its flight distance, its flight direction and the like.

As one of the methods of producing the rubber thread for the wound golf ball, the so-called latex blend method has been used. In the latex blend method, rubber latex is mixed with a cross-linking agent and an additive to form a latex composition. Then, a conveyor belt having a liquid coagulating agent which has adhered to its surface is passed through the latex composition. The latex composition which has adhered to the conveyor belt is solidified to form a rubber sheet. The rubber sheet is cut to predetermined widths after the rubber sheet is cross-linked to produce the rubber thread.

The rubber thread obtained by the latex blend method has a uniform thickness. Thus, in winding the rubber thread while it is being stretched at 600% to 1000%, it is not broken easily. Because the rubber thread obtained by the latex blend method has a low modulus, it can be stretched sufficiently at a comparatively low tensile force. Therefore, when the rubber thread obtained by the latex blend method is wound as the core of the golf ball, it has a high density, which improves the repulsive performance of the golf ball.

However, the rubber latex which is used in the latex blend method is liquid. Thus, the latex blend method has a low work efficiency. Further, because the rubber latex is expensive, the material cost of the golf ball becomes expensive.

As the another method of producing the rubber thread, a dry blend method is known, as disclosed in Japanese Patent Application Laid-Open No. 56-34736. In the dry blend method, components such as solid rubber, a cross-linking agent, and an additive are kneaded with a kneader such as a Banbury mixer to form a rubber composition. The rubber composition is processed into a sheet material by a calender. The sheet material is cut to form the rubber thread. In the dry blend method, the kneader can mix the components easily with one another, and the producing process can be simplified. Thus, the dry blend method has a high operability.

However, the rubber thread obtained in the dry blend method has a non-uniform thickness and is liable to be broken when it is wound as the core of the golf ball while it is being stretched. To prevent the breakage of the rubber thread, means for making the average thickness thereof large is conceivable. However, the thick rubber thread stretches insufficiently, and thus the density of the rubber thread forming the core is low. To prevent the breakage of the rubber thread, means for using a large amount of an assistant cross-linking agent is also conceivable. However, in this case, the modulus of the rubber thread becomes high, and thus the density of the rubber thread forming the core is low. The golf ball having the core whose rubber thread has a low density has an insufficient hardness and thus a low coefficient of repulsion.

SUMMARY OF THE INVENTION

The present invention has been made in view of the above-described problems. Thus, it is an object of the present invention to provide a rubber thread, for a golf ball, which can be produced with a high workability, stretches easily, and is not broken easily when it is stretching.

To achieve the object, a method, according to the present invention, of producing a rubber thread for a golf ball comprises (a) an extruding process of extruding a rubber composition in the shape of a sheet by using an extruder to obtain a sheet material; (b) a rolling process of rolling the sheet material to make the sheet material thin to obtain a thin sheet material; (c) a cross-linking process of cross-linking the thin sheet material to obtain a cross-linked sheet material; and (d) a cutting process of cutting the cross-linked sheet material to obtain a rubber thread.

According to this method of producing, initially, the rubber composition is extruded in the shape of a sheet, and then the sheet material is thinned in the rolling process. Unlike the conventional dry blend method, the method of producing of the present invention allows the thickness of the thin sheet material, namely, the thickness of the rubber thread to be uniform. Accordingly, the rubber thread is not easily broken when it is wound as the core of a golf ball. Further, because the method of producing of the present invention allows the thickness of the rubber thread to be small, the rubber thread forming the core has a high density.

The sheet material obtained in the extruding process is rolled in the rolling process before a temperature of the sheet material does not drop. Thereby, it is unnecessary to heat the sheet material in the rolling process and thus possible to save energy. By performing the rolling process successively to the extruding process, it is unnecessary to secure a sheet material-storing place and thus space-saving.

Preferably, the thickness t1 of the sheet material obtained in the extruding process is set to the range of 1 mm to 8 mm both inclusive, and the thickness t2 of the thin sheet material obtained in the rolling process is set to the range of 0.3 mm to 0.6 mm both inclusive. Thereby, it is possible to make the thickness of the rubber thread small and uniform.

The ratio of the thickness t2 of the thin sheet material obtained in the rolling process to the thickness t1 of the sheet material obtained in the extruding process is set to a range of 0.03 to 0.5 both inclusive. Thereby, it is possible to make the thickness of the rubber thread uniform.

DETAILED DESCRIPTION OF THE PREFERRED EMBODIMENTS

The embodiment of the present invention will be described below with reference to drawings.

Figure 1:
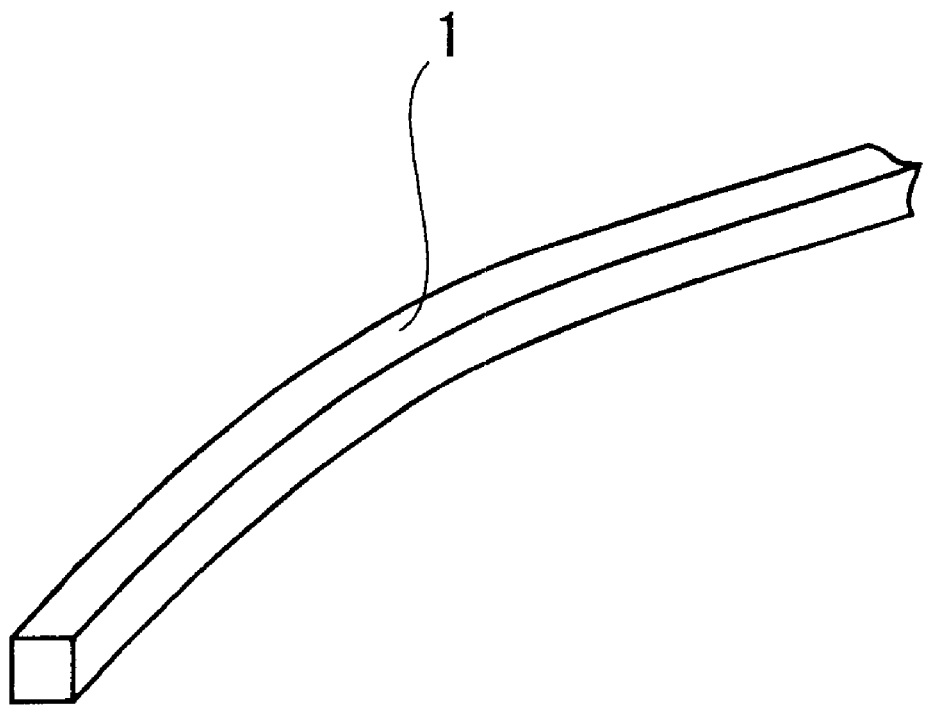
FIG. 1 is a perspective view showing a rubber thread for a golf ball according to an embodiment of the present invention.
Figure 2:
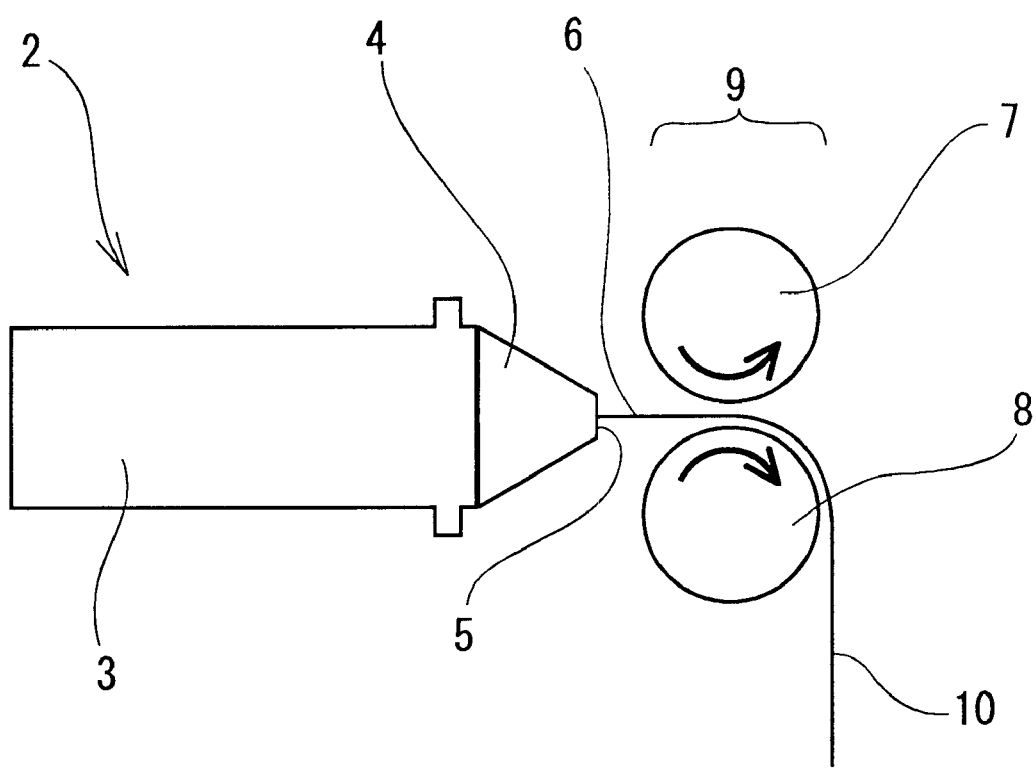
FIG. 2 shows an example of the method of producing the rubber thread for the golf ball of the present invention.

FIG. 1 is a perspective view showing a rubber thread 1 for a golf ball according to an embodiment of the present invention. FIG. 2 shows an example of a method of producing the rubber thread.

To form the rubber thread 1, a rubber composition is obtained by using a kneader. As the rubber for the rubber composition, both natural rubber and synthetic rubber can be used. To suit the repulsive performance of the golf ball, pale crepe is mostly used as the natural rubber. Isoprene rubber containing much trans-structure is mostly used as the synthetic rubber. As a cross-linking agent which is used for the rubber composition is mostly sulfur. In the case where an assistant cross-linking agent is used for the rubber composition, zinc oxide may be used. The rubber composition may contain a phenolic antioxidant or additives. The zinc oxide is liable to increase the modulus of the rubber thread 1 and cause the rubber thread 1 to elongate insufficiently. Thus, it is preferable that the rubber composition contains a necessary minimum amount of the zinc oxide.

The obtained rubber composition is supplied to a cylinder 3 of an extruder 2 shown in FIG. 2 and extruded from a discharge opening 5 of a head 4 to process it as a sheet material 6. The extruder 2 prevents the sheet material 6 from becoming non-uniform in its thickness. A screw type mono-axial extruder can be most favorably used. The screw type mono-axial extruder prevents orientation of the rubber, thus allowing the extruded sheet material 6 to shrink in a small amount and preventing its thickness from becoming non-uniform. In the screw type mono-axial extruder, it is favorable to set the number of rotations of the screw to 1–60 rpm and more favorable to 15–40 rpm to make the thickness of the sheet material 6 uniform.

It is favorable to set the temperature inside the cylinder 3 to 50–80° C. and more favorable to 60–70° C. By setting the temperature inside the cylinder 3 to the above range, it is possible to prevent the surface of the sheet material 6 from becoming irregular and prevent the rubber from being burnt. It is favorable to set the temperature inside the head 4 to 80–110° C. and more favorable to 90–100° C. By setting the temperature inside the head 4 to the above range, it is possible to prevent the surface of the sheet material 6 from becoming irregular and prevent the rubber from being burnt. It is preferable to provide the inside of the cylinder 3 with a mesh to remove a foreign matter contained in the rubber composition. The smaller the size of the mesh is, the more efficiently the foreign matter can be removed. But if the size of the mesh is too small, the rubber passing through the mesh is burnt by heat generated thereby. Thus, the mesh having the size #60-#120 can be preferably used.

It is favorable to set the thickness t1 of the extruded sheet material 6 to the range of 1 mm to 8 mm both inclusive and more favorable to the range of 2 mm to 6 mm both inclusive. If the thickness t1 of the extruded sheet material 6 is less than the lower limit of the range, it is difficult to extrude the rubber composition and there is a possibility that the rubber is burnt owing to heat release of the rubber composition. On the other hand, if the thickness t1 of the extruded sheet material 6 is more than the upper limit of the range, it is necessary to thin the sheet material 6 greatly in a rolling process which is carried out subsequently to the extruding process. In this case, as will be described in detail later, there is a possibility that the sheet material is non-uniform in its thickness.

The sheet material 6 obtained in the extruding process is fed to a calender 9 having an upper roll 7 and a lower roll 8. The upper roll 7 and the lower roll 8 rotate in opposite directions, as shown with arrows of FIG. 2. The sheet material 6 is passed between the upper roll 7 and the lower roll 8 to roll it. Thereby, it becomes thin. In this manner, a thin sheet material 10 is obtained (rolling process). The extruder 2 and the calender 9 are arranged continuously to roll the sheet material 6 obtained in the extruding process before the temperature of the sheet material 6 does not drop. Accordingly, it is unnecessary to heat the sheet material 6 before the rolling process is carried out and secure a storing place for temporarily storing the sheet material 6. It is preferable to set the temperature of the upper roll 7 and the lower roll 8 in the rolling process almost equally to that of the head 4 of the extruder 2 in the extruding process.

It is favorable to set the thickness of the thin sheet material 10 to the range of 0.3 mm to 0.6 mm both inclusive, more favorable to the range of 0.32 mm to 0.48 mm both inclusive, and most favorable to the range of 0.33 m to 0.40 mm both inclusive. If the thickness t2 is less than the lower limit of the above range, the rubber thread 1 is liable to be broken when it is wound as the core of the golf ball. On the other hand, if the thickness t2 is more than the upper limit of the above range, there is a possibility that the rubber thread 1 cannot be elongated sufficiently when it is wound as the core of the golf ball and thus the density of the rubber thread 1 forming its core may be low. The golf ball will have an insufficient hardness and thus have a low coefficient of repulsion if it has the core whose rubber thread 1 has a low density. The thickness t2 of the thin sheet material 10 is coincident with that of the rubber thread 1 obtained as an end product.

The standard deviation σ of the thickness t2 of the thin sheet material 10 obtained by a method which will be described later in detail is favorably not more than 0.02 and more favorably not more than 0.016. If the standard deviation σ is larger 0.02, the rubber thread 1 is liable to be broken when it is wound as the core.

It is favorable to set the ratio of the thickness t2 of the thin sheet material 10 obtained in the rolling process to the thickness t1 of the sheet material 6 obtained in the extruding process to the range of 0.03 to 0.5 both inclusive, more favorable to the range of 0.05 to 0.3, and most favorable to the range of 0.07 to 0.2. If the ratio t2/t1 is less than the lower limit, a large amount of the rubber composition collects in a suction of the upper roll 7 and that of the lower roll 8, the thickness of the thin sheet material 10 will be non-uniform in its widthwise direction. On the other hand, if the ratio t2/t1 is more than the upper limit, the amount of the rubber which is supplied to the upper roll 7 and the lower roll 8 will be insufficient. Consequently, the thin sheet material 10 will not be kept uniform in its thickness or will be cut or uncontinuous partially.

Figure 3:
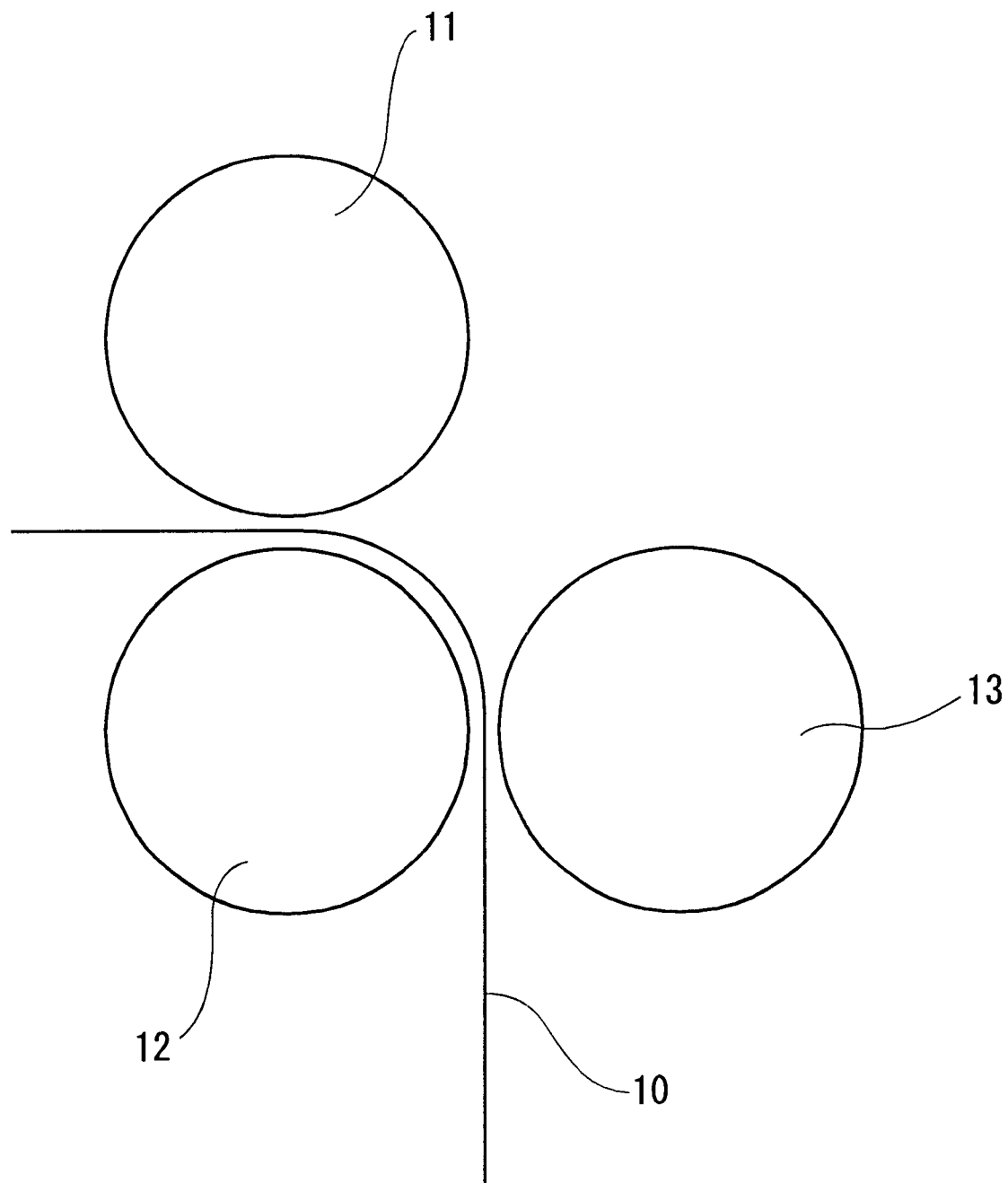
FIG. 3 shows another example of the method of producing the rubber thread for the golf ball of the present invention.

The above-described calender 9 consist of the upper roll 7 and the lower roll 8, as shown in FIG. 2, but may consist of a first roll 11, a second roll 12, and a third roll 13 as shown in FIG. 3.

The thin sheet material 10 thus obtained is cross-linked by a known cross-linking means such as a vulcanizer to form a cross-linked sheet (cross-linking process). The rubber thread 1 is obtained (cutting process) by cutting the cross-linked sheet to predetermined widths.

EXAMPLES

The effect of the present invention is clarified based on the examples described below. "Part" used in the description of the amount of each component which will be made below means a ratio determined on a mass basis.

Example 1

A rubber composition was obtained by kneading 30 parts of natural rubber (pale crepe); 70 parts of isoprene rubber (produced by Shell Inc. in the trade name of "Califlex 309"); two parts of sulfur; one part of an n-butyraldehyde-aniline condensate serving as a vulcanization accelerator (produced by Kawaguchi Kagaku Inc. in the commercial name of "Vanax 808"); three parts of zinc oxide; one part of stearic acid; and one part of 2,2-methylene-bis(4-ethyl-6-tert-butylphenol) serving as an antioxidant (produced by Yoshitomi Seiyaku Inc. in the trade name of "Yoshinox 425") by using a kneader. The rubber composition was ribbon-shaped and supplied to a cylinder of a screw type mono-axial extruder. The rubber composition was extruded from a head having a mouthpiece whose thickness was 4 mm and width was 30 $\mu$m to obtain a sheet material. The temperature inside the cylinder and that of the head were set to 70° C. and 90° C., respectively. The number of rotations of the screw was set to 20 rpm. The thickness of the sheet material was 4 mm.

Immediately thereafter, the sheet material was passed between the upper roll and the lower roll to process it into a thin sheet material having a width of 300 mm and a length of 30 m. The temperature of the upper roll and that of the lower roll were set to 90° C. at this time. Then, the tin sheet material was supplied to a vulcanizer to vulcanize it with vapor at 130° C. for 150 minutes to obtain a cross-linked sheet material.

Examples 2–4

In each of the examples 2–4, a cross-linked sheet material was obtained in a manner similar to that of the example 1, except that the interval between the upper roll and the lower roll of the calender was different from that of the example 1.

Examples 5–7

In each of the examples 5–7, a cross-linked sheet material was obtained in a manner similar to that of the example 1, except that amounts of the components were partly varied as shown in table 1 and that the interval between the upper roll and the lower roll of the calender was different from that of the example 1.

Comparison Example 1

The rubber composition obtained by kneading the components with the kneader was supplied to the calender to process it into a thin sheet material. A cross-linked sheet material was obtained by vulcanizing the thin sheet material in the same condition as that of the example 1.

Comparison Example 2

A cross-linked sheet material was obtained in a manner similar to that of the comparison example 1, except that amounts of components were varied as shown in table 1.

REFERENCE EXAMPLE

The following components were mixed with one another: natural rubber latex whose solid content was 50 parts; isoprene rubber latex whose solid content was 50 parts; four parts of sulfur; one part of a vulcanization accelerator (above-described "Vanax 808"); three parts of zinc oxide; one part of stearic acid; and one part of an antioxidant (trade name: above-described "Yoshinox 425"). Then, a coagulating agent was added to the mixture. Then, the mixture was stirred to obtain a rubber latex composition. A conveyor belt made of cloth was immersed in the rubber latex composition to adhere the rubber latex composition to the surface of the conveyor belt. After the rubber latex composition was dried, it was torn off from the conveyor belt to obtain a thin sheet material. The thin sheet material was vulcanized in the same condition as that of the example 1 to obtain a cross-linked sheet material.

(Measurement of Thin Sheet Material)

Figure 4:
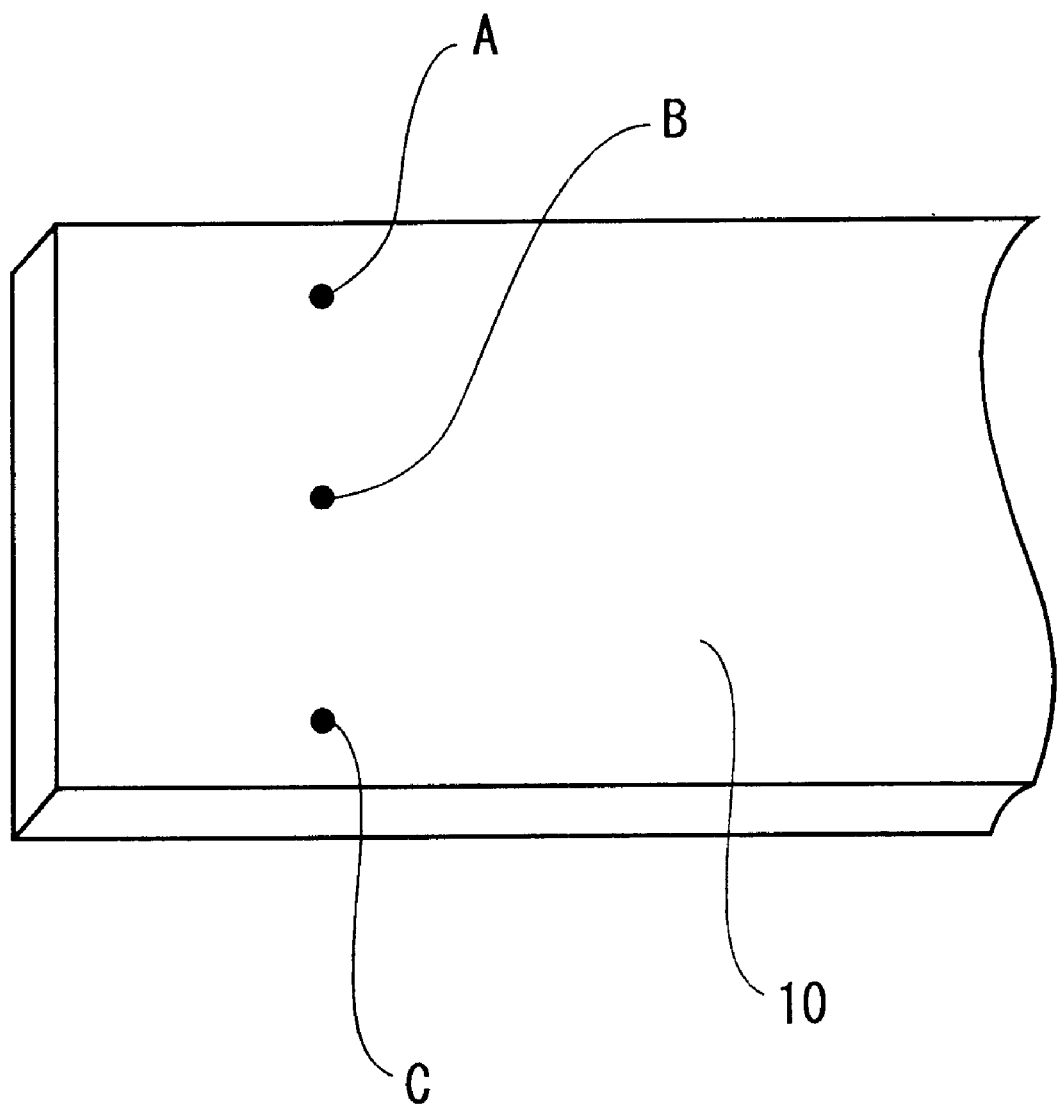
FIG. 4 is a perspective view showing portions of a thin sheet material at which a thickness thereof is measured.

Referring to FIG. 4, the thickness of the thin sheet material was measured at a point A spaced at 20 mm from one end of a thin sheet material in its widthwise direction, a point C spaced at 20 mm from the other end thereof in its widthwise direction, and a point B located at the center thereof in its widthwise direction. The thicknesses of the three points (A, B, and C) were repeatedly measured 30 times at regular intervals of 1 mm in the longitudinal direction of the thin sheet material. The average thickness of the thin sheet material, the standard deviation $\sigma$ of its thickness, and the ratio t2/t1 were computed by using the thicknesses measured at 90 points. Table 1 shown below shows the results.

(Measurement of Modulus)

Specimens were prepared by punching the cross-linked sheet material into the shape of a dumbbell to measure the modulus thereof in accordance with JIS-K6301 when it stretched at 800%. Table 1 shown below shows the results.

(Measurement of Number of Rubber Thread-Cut Portions)

The following components were kneaded to prepare a rubber composition: 100 parts of butadiene rubber (produced by JSR Inc. in the trade name of "BR01") containing 98% of cis-1,4 component therein; five parts of zinc oxide (produced by Sakai Kagaku Kogyo Inc. in the trade name of "Zinc White No. 1"); 75 parts of barium sulfate (produced by Sakai Kagaku Kogyo Inc. in the trade name of "Balico 100"); one part of stearic acid; one part of N-cyclohexyl-2-benzothiazolyl sulfenamide (produced by Ouchi ShinkoKagalu Inc. in the trade name of "NOC-CELER CZ") serving as a vulcanization accelerator; 0.2 parts of tetramethylthiuram disulfide (produced by Ouchi ShinkoKagalu Inc. in the trade name of "NOCCELER TT") serving as another vulcanization accelerator; and nine parts of sulfur. The obtained rubber composition was supplied to a die having a spherical cavity. The rubber composition was vulcanized at 150° C. for 150 minutes to obtain a center piece, of a golf ball, having a diameter of 32 mm.

The cross-linked sheet material was so cut that it had a width of 1.8 mm to obtain a rubber thread. The rubber thread was wound on the center piece with a winding machine, while a load of 9N was being applied to the rubber thread to stretch the rubber thread to obtain 100 cores. In obtaining the 100 cores, the number of rubber thread-cut portions was counted. Table 1 shown below shows the results.

(Measurement of Deformation Amount of Core)

An initial load of 98N was applied to the 10 cores obtained in the above-described measurement of number of rubber thread-cut portions. While loads were gradually increased from98N to the final load of 1274N, the deformation amount thereof were measured. Table 1 shows the average of the measured values of the 10 cores.

Measurement of Repulsion Coefficient of Core

A hollow column made of aluminum whose mass was 200 g collided at a speed of 40 m/s with each of the 10 cores obtained in the above-described measurement of number of rubber thread-cut portions. The coefficient of repulsion of each core was determined in accordance with the law of conservation of momentum. Table 1 shows the average of the measured values of 10 cores.

TABLE 1

|  | E1 | E2 | E3 | E4 | E5 | E6 | E7 | CE1 | CE2 | Reference Example |
|---|---|---|---|---|---|---|---|---|---|---|
| Natural rubber | 30 | 30 | 30 | 30 | 50 | 50 | 50 | 30 | 50 | 50 |
| Isoprene rubber | 70 | 70 | 70 | 70 | 50 | 50 | 50 | 70 | 50 | 50 |
| Sulfur | 2 | 2 | 2 | 2 | 4 | 4 | 4 | 2 | 4 | 4 |
| Vulcanization accelerator | 1 | 1 | 1 | 1 | 1 | 1 | 1 | 1 | 1 | 1 |
| Zinc oxide | 3 | 3 | 3 | 3 | 1 | 1 | 1 | 3 | 1 | 1 |
| Stearic acid | 1 | 1 | 1 | 1 | 1 | 1 | 1 | 1 | 1 | 1 |
| Antioxidant | 1 | 1 | 1 | 1 | 1 | 1 | 1 | 1 | 1 | 1 |
| Method of Producing | D1 | D1 | D1 | D1 | D1 | D1 | D1 | D2 | D2 | L |
| Thickness (mm) of thin sheet material | 0.34 | 0.41 | 0.46 | 0.51 | 0.33 | 0.40 | 0.45 | 0.40 | 0.42 | 0.41 |
| The ratio $t_2/t_1$ | 0.09 | 0.10 | 0.12 | 0.13 | 0.08 | 0.10 | 0.11 | — | — | — |
| Thickness $\sigma$ of thin sheet material | 0.013 | 0.014 | 0.012 | 0.013 | 0.012 | 0.016 | 0.015 | 0.028 | 0.027 | 0.012 |
| Modulus (Mpa) | 5.82 | 5.82 | 5.82 | 5.82 | 2.78 | 2.78 | 2.78 | 5.82 | 2.78 | 2.75 |
| Number of thread-cut portions | 0 | 0 | 0 | 0 | 0 | 0 | 0 | 63 | 36 | 0 |
| Deformation amount (mm) of core | 3.37 | 3.78 | 3.98 | 4.52 | 2.99 | 3.18 | 3.44 | 3.88 | 3.33 | 3.26 |
| Repulsion Coefficient of core | 0.8251 | 0.8135 | 0.8033 | 0.7783 | 0.8351 | 0.8257 | 0.8155 | 0.8100 | 0.8195 | 0.8221 |
| Workability | ○ | ○ | ○ | ○ | ○ | ○ | ○ | ○ | ○ | X |

: "D1" indicates the method of producing consisting of dry blend, extruding process, and rolling process; "D2" indicates the method of producing consisting of dry blend and calendering process; and "L" indicates the latex blend method.

The rubber thread of each comparison example obtained in the calendering process performed after the dry blend method was carried out was broken. On the other hand, the rubber thread of each example obtained by the dry blend method, the extruding process, and the rolling process was not broken. The rubber thread of each example is equivalent to the rubber thread of the reference example obtained by the latex blend method. The rubber thread of each example obtained by the dry blend method is superior in workability to that obtained by the latex blend method. These results indicate that the rubber thread of the present invention is superior to the conventional one.

As apparent from the foregoing description, according to the method of producing the rubber thread for the golf ball, of the present invention, the rubber thread having a uniform thickness is obtained. The rubber thread is not easily broken when it is wound as the core of a golf ball. The rubber thread allows the core to have a high density.

What is claimed is:

1. A method of producing a rubber thread for a golf ball, comprising:
   (a) mixing a rubber and a cross-linking agent to obtain a rubber composition;
   (b) extruding the rubber composition in the shape of a sheet by using a screw type mono-axial extruder to obtain a sheet material having a thickness t1;
   (c) rolling said sheet material to make said sheet material thin to obtain a thin sheet material having a thickness t2 set to a range of 0.3 mm to 0.6 mm both inclusive, so that the ratio t2/t1 is set to a range of 0.03 to 0.5 both inclusive;
   (d) cross-linking said thin sheet material to obtain a cross-linked sheet material; and
   (e) cutting said cross-linked sheet material to obtain a rubber thread.

2. The method of producing the rubber thread for the golf ball according to claim 1, wherein said sheet material obtained in said extruding process is rolled in said rolling process before a temperature of said sheet material does not drop.

3. The method of producing the rubber thread for the golf ball according to claim 1, wherein a thickness t1 of said sheet material obtained in said extruding process is set to a range of 1 mm to 8 mm both inclusive.

4. The method of producing the rubber thread for the golf ball according to claim 2, wherein a thickness t1 of said sheet material obtained in said extruding process is set to a range of 1 mm to 8 mm both inclusive; and a thickness t2 of said thin sheet material obtained in said rolling process is set to a range of 0.3 mm to 0.6 mm both inclusive.

5. The method of producing the rubber thread for the golf ball according to claim 2, wherein the ratio of said thickness t2 of said thin sheet material obtained in said rolling process to said thickness t1 of said sheet material obtained in said extruding process is set to a range of 0.03 to 0.5 both inclusive.

6. The method of producing the rubber thread for the golf ball according to claim 3, wherein the ratio of said thickness t2 of said thin sheet material obtained in said rolling process to said thickness t1 of said sheet material obtained in said extruding process is set to a range of 0.03 to 0.5 both inclusive.

7. The method of producing the rubber thread for the golf ball according to claim 4, wherein the ratio of said thickness t2 of said thin sheet material obtained in said rolling process to said thickness t1 of said sheet material obtained in said extruding process is set to a range of 0.03 to 0.5 both inclusive.

8. A method of producing a rubber thread for a golf ball, comprising:

(a) mixing rubber and a cross-linking agent to form a rubber composition;

(b) extruding the rubber composition in the shape of a sheet by using an extruder to obtain a sheet material;

(c) rolling said sheet material to make said sheet material thin to obtain a thin sheet material;

(d) cross-linking said thin sheet material to obtain a cross-linked sheet material; and (e) cutting said cross-linked sheet material to obtain a rubber thread.

* * * * *